Nov. 6, 1956  A. D. HERMAN  2,769,648
REINFORCED T SHAPED SEAL FOR FLANGED PIPE COUPLING
Filed April 21, 1953  2 Sheets-Sheet 1
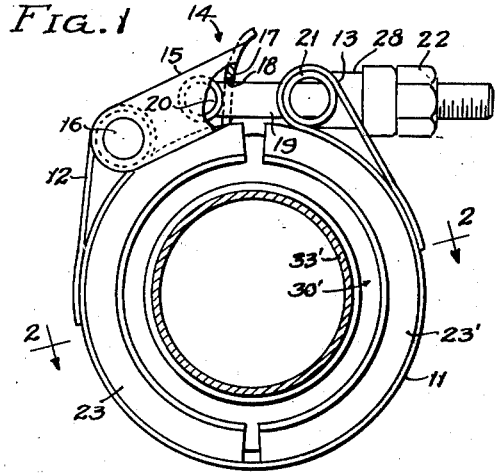
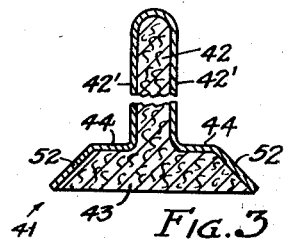
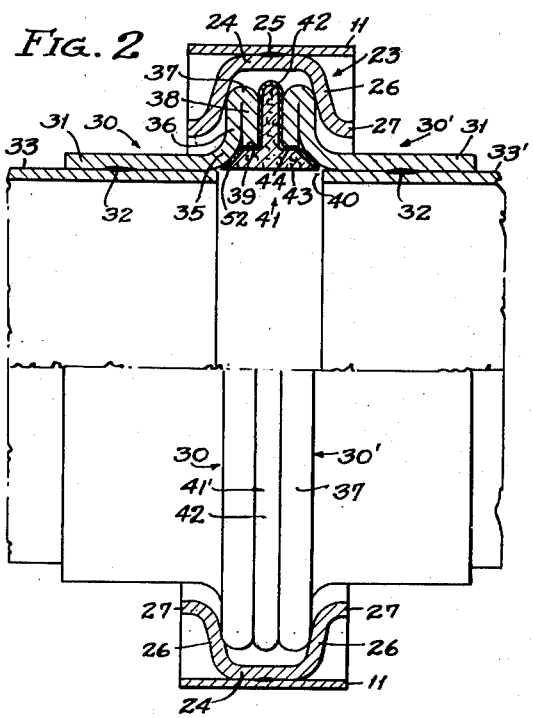
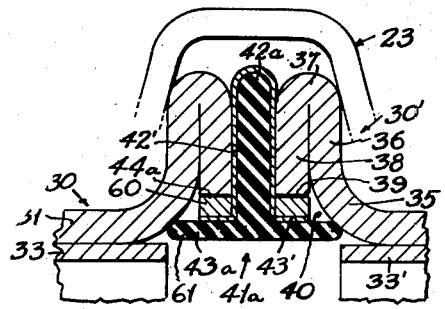
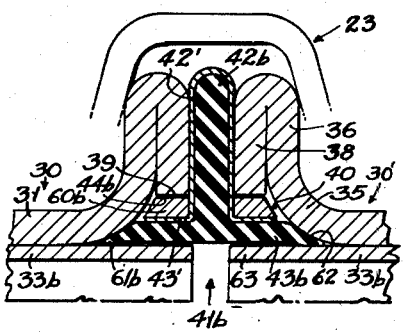
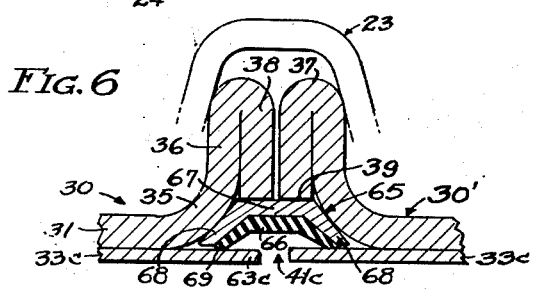
INVENTOR.
A. DALE HERMAN
BY
Lynn Latta
—ATTORNEY—

INVENTOR
A. DALE HERMAN

United States Patent Office
2,769,648
Patented Nov. 6, 1956

2,769,648
REINFORCED T SHAPED SEAL FOR FLANGED PIPE COUPLING

Albert Dale Herman, Encino, Calif., assignor, by mesne assignments, to Aeroquip Corporation, Jackson, Mich., a corporation of Michigan Application April 21, 1953, Serial No. 350,126

4 Claims. (Cl. 285—110)

This invention relates to tube couplings of the general type wherein flanges on the ends of adjoining tube sections are pressed axially against a seal ring by coupling device such as, for example, a band clamp of the V-band type embodying jaw segments of V-channel section having radially inwardly diverging jaws engageable with the tube flanges and operative to resolve radially inwardly directed forces, received from a constrictor band, into axial pressure against the flanges. The present invention relates particularly to the novel combination of tube flanges and seal ring, and has as its general object to provide an improved coupling of this general type, of especially simple and inexpensive construction, coupled with a high sealing efficiency.

A broad object of the invention is to provide a tube coupling of the general type indicated above, wherein an axially recessed flange with a radially inwardly facing shoulder is provided in the form of a rolled sheet metal part including an outer flange section and an inner flange section folded back against the outer flange section.

A particular object of the invention is to provide, in a tube coupling of this type, a novel sealing ring and flange arrangement having the dual function of (a) establishing a mechanical connection between the tube sections such as to align them on a common axis and (b) establishing a fluid tight seal between the tube sections.

A further object is to provide a fluid coupling embodying a flange structure such as that outlined above, in combination with a seal ring having a flat central radial flange for engagement under axial pressure between the tube flanges together with axially projecting flanges at the inner margin of the ring, receivable in the flange recesses and cooperable with the internal shoulders thereof for establishing a piloting connection between the tube sections.

A further object is to provide such a coupling wherein a fluid sealing connection is established as the result of application of axial pressure to the seal ring through the flanges.

A further object is to provide such a coupling wherein the fluid sealing effect is heightened by fluid pressure acting against the interior of the seal ring. In this respect, the invention has a further object to provide a high pressure fluid sealing coupling.

Another object is to provide such a coupling wherein the axial pressure applied to the tube flanges is utilized partially to attain improved sealing through a wedging action between the tube flanges and the marginal portions of the periphery of the seal ring.

In one of its forms, the invention provides a fluid sealing coupling wherein the axial pressure applied through the tube flanges is utilized for wedging the margins of the seal ring against the peripheries of the end portions of tube sections which project beyond the tube flanges.

A specific object of the invention is to provide a fluid sealing tube coupling embodying an improved seal ring the body of which is of a highly flexible or readily yieldable material such as soft rubber or the like, said seal ring embodying means to reinforce its central body portion so that it may function satisfactorily to establish a mechanical piloting connection between the tube sections, and the marginal portions of which are highly flexible so as to be responsive to fluid pressure in tightening the fluid seal.

Other objects will become apparent in the ensuing specifications and appended drawings in which:

Fig. 1 is a cross sectional view of a line of tubing embodying my improved tube coupling;

Fig. 2 is an axial sectional view thereof, partially in side elevation;

Fig. 3 is a fragmentary axial sectional view of a modified form of the coupling;

Fig. 4 is a fragmentary axial sectional view of another modified form of the coupling;

Fig. 5 is a fragmentary axial sectional view of a further modified form of the coupling;

Fig. 6 is a fragmentary axial sectional view of another modified form of the coupling;

Fig. 7 is a fragmentary detail sectional view of the form shown in Fig. 6;

Figure 8:
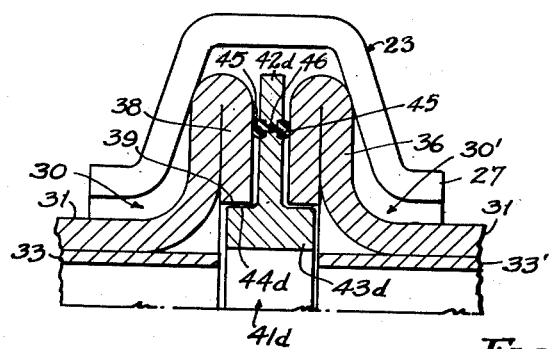
Fig. 8 is a fragmentary axial sectional view of a further modified form of the coupling.

General description of a coupling embodying the invention

Referring now to the drawings in detail, I have shown in Fig. 1, as an example of one type of device which may be utilized as the coupling portion of my device, a band clamp embodying a constrictor band 11 having its respective ends folded back upon themselves and secured (as by welding) to form loops 12, 13 which are adapted to be joined by the connector mechanism indicated generally at 14. Connector mechanism 14 includes a quick-coupler latch 15, one end of which has a cross pin 16 pivotally received in loop 12 and the other end of which has a web 17 provided with a slot 18 to receive the shank 19 of a T-bolt having a cross-head 20 which is received within latch 15 and engaged against web 17. Shank 19 is extended through the tubular shank portion 28 of a T-fitting including a cross-head providing trunnions 21 that are pivotally received in loop 13. Upon the end bolt 19 is threaded a nut 22 which engages shank 20 to draw the loops 12, 13 toward each other when the nut is advanced on the bolt.

Attached to constrictor band 11 are a plurality of jaw segments 23, 23' each having a web or crown portion 24 secured to band 11 as by spot welding at 25; together with radially inwardly diverging, frusto-conical side walls 26 functioning as jaws to engage the tube flanges and exert a wedging action thereagainst. The inner margins of jaws 26 may be reinforced by axially extending flanges 27.

The segments 23, 23' of the above described band clamp are adapted to embrace between them a pair of flange units which are indicated generally at 30, 30'. Each of these flange units include a collar portion 31 which encircles and is secured, as by a circular line of welding 32, to a respective tube section 33, 33'. Each of the flange units 30, 30' also includes an outwardly flaring bell-mouth portion 35 which is continued radially outwardly to form a flat radial outer flange section 36. At its periphery, flange section 36 is folded inwardly to provide a bend 37 by which it is integrally joined to a flat radial flange section 38 projecting radially inwardly from bend 37. The inner margin of flange section 38 provides a cylindrical inwardly facing shoulder 39 which is fairly close to the area of tangency between the inner wall of bell-mouth section 35 and the plane of the contacting faces of flange sections 36 and 38.

In the fabrication of the above described flange unit, a relatively short section of tubing is expanded by a rolling operation to form an annular inwardly opening channel which is gradually reduced in its axial width by a flattening action which finally brings the respective side portions thereof in flat face to face contact to form the folded flange structure illustrated and described above. To provide accurate concentricity of shoulder 39 with the axis of the flange unit and to impart to it a smooth cylindrical surface, a machining operation may be performed thereon after the flange unit has been rolled.

The above described flange structure is common to all of the various modifications of the invention, which differ from each other with respect to the seal ring only. The seal ring structure will now be described in detail, taking up each of the modifications separately.

The invention as disclosed in Figs. 2 and 3

In general, the invention contemplates the use of a seal ring which pilots into the annular recesses 40 defined between shoulders 39 and the inner walls of bell-mouth members 35, to establish an indexing connection between the tube sections through which they are accurately aligned and maintained in a coaxial relation. Also, in general, the invention contemplates using the opposed flat faces of inner flange sections 38 to establish sealing contact with a central portion of the seal ring.

As an example of one form of seal ring which may be utilized for these purposes, I have shown in Figs. 2 and 3 a seal ring 41 of T-section, consisting in a core body of asbestos coated with a facing of soft metal such as copper, and including a central flat radial flange 42 adapted to be interposed between tube flange sections 38, and a cylindrical inner body portion 43 from which flange 42 projects radially outwardly in the median plane thereof. Body portion 43 provides a pair of flanges projecting axially from opposite sides of flange 42 and defining a pair of cylindrical peripheral shoulders 44 which are freely receivable within tube flange shoulders 39 but with a sufficiently snug fit for accurate indexing. The axial extremities of body 43 are externally bevelled to provide conical shoulders 52. Shoulders 44 and 52, as well as side faces 42' of flange 42, are defined by respective portions of the soft metal coating.

Conical shoulders 52 are adapted to seat against the inner walls of the bell-mouth portions 35 of the flange units 30, 30'. The slope of shoulders 52 may be approximately 45° and the slope of the bell-mouth walls at the area of contact will accordingly be approximately the same. As the flange units 30, 30' are pressed toward one another by the jaw segments 23, 23', axial pressure will be exerted between the bell-mouth sections 35 and the sloping shoulders 52 of the seal ring. This will result in a wedging action which improves the sealing effect.

Under high pressure conditions, sealing action is further enhanced by the action of fluid pressure against the relatively thin tapered edges at the lateral margins of body 43, where the faces 52 intersect the cylindrical inner wall of body 43, this pressure tending to flex such edge portions of the seal ring outwardly into tighter sealing engagement with bell-mouth member 35. In this connection it will be understood that the asbestos fiber of which the body of the seal ring is composed will be such as to permit some flexing at the edges of the ring, the metal facings 52 being sufficiently ductile to permit reinforcing and supporting the asbestos at the margins of the ring during such flexing action, and such flexing to occur without disintegration of said margins.

The invention as disclosed in Fig. 4

Referring now to Fig. 4, I have shown therein a seal ring 41a embodying a flat central radial flange portion 42a and a cylindrical inner body portion 43a, the body of the ring being molded integrally from a material having the general characteristics of soft rubber, but preferably a synthetic rubber, such as "neoprene," which is resistant to deterioration in the presence of oil. Bonded to the lateral faces of flange 42a and to inner portions of the peripheral shoulder faces 44a of the seal ring 41a is a coating of ductile metal such as copper, including flat side wall portions 42' and peripheral shoulder portions 43'. Bonded (as by brazing) to the coating portion 43' and to the inner areas of coating portions 42' are a pair of reinforcing rings 60 which may be of any suitable non-corrosive metal, e. g. copper. The reinforcing rings 60 maintain the seal ring 41b in true ring form, with flange 42a maintained in a flat plane and body portion 43a maintained in truly cylindrical form. The reinforcing rings 60 have the additional function of providing the seal ring 41a with relatively rigid shoulders 44a for piloting within shoulders 39 of tube flange sections 38, thus providing the seal ring 41a, which would otherwise be quite yieldable, with adequate rigidity to perform the indexing function of the seal ring.

Body portion 43a has the axial extremities thereof projecting beyond reinforcing rings 60 to provide highly flexible, fluid pressure responsive sealing flanges 61 which are adapted to engage against the inner walls of bell-mouth members 35 to establish secondary seals, the primary seal being established by the axial pressure of tube flange sections 38 against lateral walls 42' of the seal ring. For moderately high pressure sealing purposes, the sealing flanges 61 will, in response to fluid pressure, become flattened outwardly against bell-mouth members 35 to form tight areas of sealing contact.

The invention as disclosed in Fig. 5

Fig. 5 discloses an arrangement quite similar to that disclosed in Fig. 4, the seal 41b including a flat central radial flange 42b and an inner cylindrical body portion 43b, together with a ductile metal coating 42', 43' bonded to the side faces and the cylindrical peripheral surfaces thereof. Extending beyond these peripheral surfaces are uncoated axially projecting portions of the body 43b, constituting sealing flanges 61b for sealing against bell-mouth members 35. The sealing flanges 61b differ from the flanges 61 of Fig. 4 in having beveled outer faces 62 sloped to substantially fit the contours of the inner walls of bell-mouth members 35. The seal 41b also has reinforcing rings 60b which are of trapezoidal section, being broadened inwardly so as to support the inner seal body 43b throughout a width extending closely adjacent the inner walls of bell-mouth members 35, so as to minimize any tendency of the sealing flanges 61b to be extruded outwardly between the edges of reinforcing rings 60b and bell-mouth members 35.

This form of the invention also differs from the other forms in the extension of tube sections 33b toward each other beyond the bell-mouth members 35 so as to provide pilot portions 63 which extend into the space circumscribed by inner cylindrical body 43b of the seal ring. Thus the respective ends of seal body 43b are extended into annular recesses 40 the inner sides of which are defined between the pilots 63 and the outer sides of which are defined by shoulders 39 and the inner walls of bell-mouth section 35. The sealing flanges 62 are adapted to be wedged into the tapered axial extremities of these spaces, between the converging walls of bell-mouth members 35 and pilots 63. In such wedging action, the tapered extremities of sealing flanges 61b are flexed inwardly and pressed against the outer walls of projecting tube members 63. This wedging action establishes an initial seal which is independent of fluid pressure. However, in response to fluid pressure within the fluid line, the sealing flanges 61b will be pressed outwardly against bell-mouth members 35 to increase the sealing action in accordance with increase in fluid pressure.

The invention as disclosed in Figs. 6 and 7

Figs. 6 and 7 disclose a further modification of the invention wherein a sealing ring 41c comprises an outer retainer ring 65 of trapezoidal channel section, fabricated from a relatively rigid material such as metal, together with a packing liner 66 of relatively soft compressible material such as synthetic rubber or its equivalent. Retainer ring 65 includes a cylindrical central web portion 67 and side wall flanges 68 which diverge radially inwardly so as to provide frustro-conical outer walls for wedging engagement against the inner walls of bell-mouth sections 35.

Referring now to Fig. 7, the liner 66 has marginal portions 69 which project radially inwardly beyond the inner margins of side wall flanges 68 and are adapted to engage the outer walls of projecting portions 63c of tube sections 33c.

As wedging pressure is applied to the tube flange units 30, 30' by jaw segments 23, 23', the side wall flanges 68 will be flexed inwardly as indicated by arrows 70 in Fig. 7, the flanges 68 moving toward each other and assuming a somewhat steeper angle of inclination, and the projecting marginal portions 69 of the sealing liner being flattened against the outer walls of projecting tube portions 63, to establish a fluid-tight seal.

The invention as disclosed in Fig. 8

Fig. 8 illustrates how the invention may utilize a seal 41d comprising a body ring having a radial flange 42d and a cylindrical inner body 43d having peripheral shoulders 44d adapted to pilot within internal shoulders 39 of tube flange sections 38.

Fluid seal is established between radial flange 42d and tube flange sections 38 by a pair of O-rings 45 which are seated in annular face grooves in the respective sides of flange 42d and are joined integrally by a series of narrow webs 46 projecting through circumferentially spaced apertures in flange 42. Axial pressure applied by band clamp jaw segments 23, 23' through tube flange units 30, 30' to O-rings 45 will flatten the latter to establish a fluid tight joint between the tube sections, while the tube sections are maintained securely in axial alignment by the piloting of the peripheral shoulders 44d of seal ring body 43d within the shoulders 39 of flange units 30, 30'. Thus a very simple yet effective coupling embodying both the indexing connection and a fluid seal, is established.

The invention contemplates the possibility of fabricating the seal ring 42, 43 from aluminum, with the O-rings 45 and connecting webs 46 molded into the aluminum body. Other metals or materials could be used. A desirable material for the seal rings 45 is synthetic rubber such as "neoprene."

Figure 9:
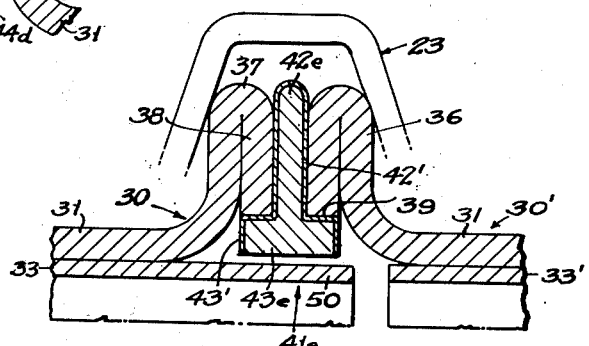
Fig. 9 is a fragmentary axial sectional view of a further modified form of the coupling.

The invention as disclosed in Fig. 9

Fig. 9 discloses a seal ring 41e which has a cross-sectional shape similar to that of ring 41d, but which may be constructed of a material such as metal-clad asbestos, the asbestos core being covered by a coating on flange 42, peripheral shoulders 44 and body portion 43, these respective portions of the coating being indicated by the numerals 42', 44' and 43' respectively. The portion 43' of the coating functions only to cover the side margins of body portions 43e and may if desired be dispensed with. The coating is composed of a ductile metal, such as copper, bonded to the surfaces of the rings.

As illustrated, the inner tube flange sections 38 are pressed against the flat side portions 42' of the metal coating of the seal ring, in order to establish the seal. The soft metal has sufficient ductility to adapt itself to any imperfections in the flat faces of flange sections 38, in order to establish a tight seal. The portion 44' of the coating provides a metal shoulder for piloting against the flange shoulder 39, the shoulder 44' being of greater durability than the asbestos and also supporting the surface of the asbestos so as to maintain a more accurate shoulder surface.

Fig. 9 also illustrates how one of the tube sections (e. g. tube section 33) may be extended beyond its flange unit 30 to provide a pilot 50 receivable through the opening defined within body portion 41a of the seal ring, so as to reduce turbulence of the fluid passing through the fluid joint. If desired, the inner wall of seal ring body 41a may be fitted sufficiently close to the outer wall of pilot 50 so as to obtain a supplementary piloting action which not only increases the security of alignment but also supports the inner wall of the asbestos seal ring body.

Figure 10:
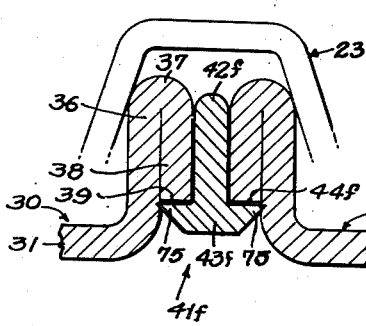
Fig. 10 is a fragmentary axial sectional view of a further modified form of the coupling.

The form of the invention shown in Fig. 10

Fig. 10 discloses a form of the invention utilizing a seal 41f which includes a central radial outer flange 42f and an inner seal body 43f the axial extremities of which are internally bevelled to provide knife edges 75 where the bevelled faces intersect the peripheral shoulders 44f of body 43f.

Seal ring 41f is of hardened metal, harder than the metal of flange units 30, 30' and the knife edges 75 are adapted to be embedded in bell-mouth members 35 of the flange units 30, 30', immediately adjacent the shoulders 39. The shoulders 44f of the seal ring are adapted to fit fairly snugly within shoulders 39 to establish piloting connection between the tube sections through the seal ring. The flange sections 38, when drawn tightly against the seal ring by the band clamp, will be somewhat out of contact with flange 42f, in order that full pressure sealing engagement may be maintained between knife edges 75 and the flange units.

Figure 11:
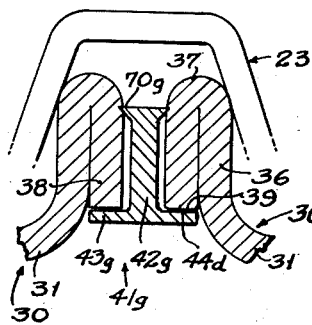
Fig. 11 is a fragmentary axial sectional view of a further modified form of the coupling.

The invention as disclosed in Fig. 11

Fig. 11 discloses another modification of the invention, generally similar to that of Fig. 10, but having knife edges 75g formed at the periphery of radial flange 42g and projecting axially from the lateral faces thereof, instead of having the knife edges formed on the annular inner body 43g of the seal ring. The respectively axially projecting flanges which are provided by body 43g define peripheral shoulders 44d which pilot within the internal shoulders 39 of the tube flange sections 38.

I claim:

1. A coupling for joining the ends of the sections in a fluid line, comprising: a pair of tube flange units, each including a collar portion, a bell mouth portion flaring outwardly therefrom, an intermediate flange portion extending radially outwardly from said bell mouth portion, and a terminal flange folded inwardly from the periphery of the said intermediate flange portion and having a flat radial inner face and an inner margin constituting a cylindrical shoulder which is disposed radially outwardly of said bell mouth portion, said shoulders and bell mouth portions cooperating to define an annular recess of trapezoidal section having inwardly flaring lateral walls; and a seal ring of T-section including a central leg in the form of a flat flange interposed between and sealed to the flat inner faces of said terminal flanges and a cross-head integrally joined to the inner margin of said central leg, said cross-head comprising opposed cylindrical flanges projecting axially from opposite sides of said central leg, and reinforcing rings encircling said cross-head flanges adjacent the respective sides of said central leg, fitted within said cylindrical shoulders of the terminal flanges with a piloting action and supporting said cross-head flanges against radial expansion under the fluid pressure in said line, said central leg and cross-head being of soft, flexible, yieldable material and said reinforcing rings being of rigid non-yielding material, said cross-head flanges having marginal portions projecting axially beyond the outer sides of said reinforcing rings and in sealing engagement with flaring inner walls of said bell mouth portions to provide a seal that is made more fluid tight by yielding of said projecting marginal portions of the cross-head flanges under the fluid pressure in said line.

2. A coupling, as defined in claim 1, wherein said reinforcing rings are of rectangular cross-section and said cross-head flanges are of uniform thickness substantially to their side margins.

3. A coupling, as defined in claim 1, wherein said reinforcing rings are of trapezoidal cross section, with outer lateral faces flaring in approximate parallelism to the flares of said bell mouth portions, and wherein said cross-head flanges have marginal portions of wedge-shaped section provided with outer bevelled faces conforming substantially to the flaring inner faces of said bell mouth portions.

4. A coupling, as defined in claim 1, wherein said reinforcing rings are of trapezoidal cross section, with outer lateral faces flaring in approximate parallelism to the flares of said bell mouth portions, and wherein said cross-head flanges have marginal portions of wedge-shaped section provided with outer bevelled faces conforming substantially to the flaring inner faces of said bell mouth portions; said coupling further including tube sections secured within said collars and including inner end portions projecting beyond said bell mouth portions into the spaces encircled by said cylindrical shoulders, and defining with the latter, trapezoidal spaces in which said cross-head flanges and reinforcing rings are received.

References Cited in the file of this patent

UNITED STATES PATENTS

| | | |
|---|---|---|
| 682,026 | Bungerath | Sept. 3, 1901 |
| 740,664 | Kroll | Oct. 6, 1903 |
| 849,883 | Brinkman | Apr. 9, 1907 |
| 893,434 | Brinkman | July 14, 1908 |
| 1,065,892 | Albert | June 24, 1913 |
| 1,561,033 | Spencer | Nov. 10, 1925 |
| 1,931,922 | Damsel et al. | Oct. 24, 1933 |
| 1,978,453 | Flynn | Oct. 30, 1934 |
| 2,014,313 | Damsel | Sept. 10, 1935 |
| 2,271,425 | Harris | Jan. 27, 1942 |
| 2,318,006 | Mercier | May 4, 1943 |
| 2,441,754 | Cobi | May 18, 1948 |
| 2,513,178 | Jackson | June 27, 1950 |
| 2,561,648 | Bradley | July 24, 1951 |
| 2,602,678 | Mahof et al. | July 8, 1952 |
| 2,635,900 | Mayo et al. | Apr. 21, 1953 |

FOREIGN PATENTS

| | | |
|---|---|---|
| 34,516 | France | Sept. 4, 1929 |
| 374,623 | Germany | Apr. 27, 1923 |
| 444,939 | Great Britain | Mar. 31, 1936 |
| 479,296 | Great Britain | Feb. 3, 1938 |
| 719,745 | France | Feb. 9, 1932 |
| 727,036 | France | June 11, 1932 |